US012711945B2

(12) United States Patent
Wu

(10) Patent No.: US 12,711,945 B2
(45) Date of Patent: Aug. 18, 2026

(54) SPEECH SPEED ADJUSTMENT METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventor: Menglin Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 215 days.

(21) Appl. No.: 18/693,071

(22) PCT Filed: Oct. 8, 2022

(86) PCT No.: PCT/CN2022/123836
§ 371 (c)(1),
(2) Date: Mar. 18, 2024

(87) PCT Pub. No.: WO2023/061259
PCT Pub. Date: Apr. 20, 2023

(65) Prior Publication Data

US 2024/0386903 A1 Nov. 21, 2024

(30) Foreign Application Priority Data

Oct. 14, 2021 (CN) .......................... 202111199704.2

(51) Int. Cl.
*G10L 13/08* (2013.01)
*G10L 21/043* (2013.01)
*G10L 25/30* (2013.01)

(52) U.S. Cl.
CPC ............ *G10L 13/08* (2013.01); *G10L 21/043* (2013.01); *G10L 25/30* (2013.01)

(58) Field of Classification Search
None
See application file for complete search history.

(56) References Cited

U.S. PATENT DOCUMENTS

2022/0310059 A1* 9/2022 Jia ........................ G06N 3/0895
2023/0087916 A1* 3/2023 Lin ....................... G10L 13/047
704/258

(Continued)

FOREIGN PATENT DOCUMENTS

CA 2145016 A1 10/1995
CN 110299131 A 10/2019

(Continued)

OTHER PUBLICATIONS

Ren, Yi, et al. "Fastspeech: Fast, robust and controllable text to speech." Advances in neural information processing systems 32 (2019). (Year: 2019).*

(Continued)

*Primary Examiner* — Douglas Godbold
(74) *Attorney, Agent, or Firm* — Astute IP Law Group

(57) ABSTRACT

A speech speed adjustment method, an apparatus, an electronic device and a readable storage medium are provided. The method includes: acquiring a text to be synthesized; inputting the text to be synthesized to a speech synthesis model, acquiring a target spectrum corresponding to the text to be synthesized output by the model which includes an encoding network for converting the input text to be synthesized into an acoustic feature sequence, an attention network for outputting the attention vector and a decoding network for outputting the target spectrum corresponding to the text to be synthesized according to the attention vector being input, the acoustic feature sequence and a state transition control factor being used for controlling a number of target spectrums corresponding to the text to be synthesized; and acquiring a target audio having a target speech speed, according to the target spectrum corresponding to the text to be synthesized.

15 Claims, 3 Drawing Sheets

(56) References Cited

U.S. PATENT DOCUMENTS

| | | | | |
|---|---|---|---|---|
| 2023/0186895 A1* | 6/2023 | Kim | G10L 13/027 | 704/260 |
| 2023/0230576 A1* | 7/2023 | Nolasco | G10L 13/027 | 704/260 |
| 2023/0298562 A1* | 9/2023 | Pan | G06F 40/289 | 704/260 |
| 2023/0306954 A1* | 9/2023 | Pan | G10L 13/027 | |
| 2024/0105160 A1* | 3/2024 | Kim | G10L 13/047 | |
| 2024/0169973 A1* | 5/2024 | Chang | G10L 13/027 | |
| 2025/0078809 A1* | 3/2025 | Bengio | G06N 3/045 | |

FOREIGN PATENT DOCUMENTS

| | | |
|---|---|---|
| CN | 110808027 A | 2/2020 |
| CN | 111292719 A | 6/2020 |
| CN | 112185363 A | 1/2021 |
| CN | 112233649 A | 1/2021 |
| CN | 112289298 A | 1/2021 |
| CN | 112599113 A | 4/2021 |
| CN | 112786008 A | 5/2021 |
| CN | 113327575 A | 8/2021 |
| CN | 113436600 A | 9/2021 |
| EP | 1970894 A1 | 9/2008 |
| GB | 2591245 A | 7/2021 |
| JP | 2003271200 A | 9/2003 |

OTHER PUBLICATIONS

International Search Report and Written Opinion for PCT/CN2022/123836, mailed Dec. 15, 2022, 15 pages.

Krueger et al., "Zoneout: Regularizing RNNs by Randomly Preserving Hidden Activations", conference paper at ICLR, 2017, 11 pages.

Shen et al., "Natural TTS Synthesis by Conditioning Wavenet on MEL Spectrogram Predictions", Google, Inc., 2018, 5 pages.

First Office Action for Chinese Patent Application No. 202111199704.2, mailed on May 15, 2025, 15 pages.

* cited by examiner

SPEECH SPEED ADJUSTMENT METHOD AND APPARATUS, ELECTRONIC DEVICE, AND READABLE STORAGE MEDIUM

CROSS REFERENCE TO RELATED APPLICATIONS

This is a national stage application based on International Patent Application No. PCT/CN2022/123836, filed Oct. 8, 2022, which claims priority to Chinese Patent Application filed with the China Patent Office on Oct. 14, 2021, with the application No. 202111199704.2 and entitled "Speech Speed Adjustment Method, Apparatus, Electronic Device, and Readable Storage Medium", the disclosures of which are incorporated herein by reference in their entireties.

TECHNICAL FIELD

The disclosure relates to the field of the Internet, in particular to a speech speed adjustment method, an apparatus, an electronic device, and a readable storage medium.

BACKGROUND

Electronic devices often need to adjust the speech speed of audio. For example, when users play a video with electronic devices, they often play at double-speed, such as 1.25 times, 1.5 times, and 2.0 times or the like, so it is necessary to adjust the speech speed of audio in video to adapt to double-speed playback.

In the related art, the speech speed adjustment of audio usually uses digital signal processing (DSP) technology to discard, resample, and interpolate the audio and so on, so as to extend or shorten the duration of audio and realize the speech speed adjustment of audio. However, using the above method, flexible speech speed adjustment cannot be realized.

SUMMARY

To solve the above technical problems or at least partially solve the above technical problems, the present disclosure provides a speech speed adjustment method, an apparatus, an electronic device, and a readable storage medium.

In the first aspect, the present disclosure provides a method for speech speed adjustment, comprising:

- acquiring a text to be synthesized;
- inputting the text to be synthesized to a speech synthesis model, and acquiring a target spectrum corresponding to the text to be synthesized output by the speech synthesis model, wherein the speech synthesis model comprises an encoding network, an attention network and a decoding network, with the encoding network being used for converting the input text to be synthesized into an acoustic feature sequence; the attention network being used for outputting the attention vector, and the decoding network being used for outputting the target spectrum corresponding to the text to be synthesized according to the attention vector being input, the acoustic feature sequence and a state transition control factor; and the state transition control factor being used for controlling a number of target spectrums corresponding to the text to be synthesized; and
- acquiring a target audio according to the target spectrum corresponding to the text to be synthesized, wherein the target audio has a target speech speed.

In the second aspect, the present disclosure provides an apparatus for speech speed adjustment, comprising:

- an acquisition module for acquiring a text to be synthesized;
- a spectrum feature extraction module for inputting the text to be synthesized to a speech synthesis model and acquiring a target spectrum corresponding to the text to be synthesized output by the speech synthesis model, wherein the speech synthesis model comprises an encoding network, an attention network and a decoding network, with the encoding network being used for converting the input text to be synthesized into an acoustic feature sequence; the attention network being used for outputting an attention vector, and the decoding network being used for outputting a target spectrum corresponding to the text to be synthesized according to the attention vector being input, the acoustic feature sequence and a state transition control factor; the state transition control factor being used for controlling the number of the target spectrum; and
- an audio processing module for acquiring a target audio according to the target spectrum corresponding to the text to be synthesized, and wherein the target audio has a target speech speed.

In the third aspect, the present disclosure provides an electronic device comprising: a memory and a processor;

- wherein the memory is configured to store computer program instructions;
- the processor is configured to execute the computer program instructions, causing the electronic device to realize a speech speed adjustment method according to any one of the first aspect.

In the fourth aspect, the present disclosure provides a readable storage medium comprising: computer program instructions; wherein the computer program instructions, when executed by at least one processor of an electronic device, cause the electronic device to realize a speech speed adjustment method according to any one of the first aspect.

In the fifth aspect, the present disclosure provides a program product comprising: computer program instructions; the computer program instructions are stored in a readable storage medium, and an electronic device acquires the computer program instructions from the readable storage medium when the computer program instructions are executed by at least one processor of the electronic device, the electronic device is enabled to realize the speech speed adjustment method according to any one of the first aspects.

The present disclosure provides a speech speed adjustment method, an apparatus, an electronic device, and a readable storage medium, wherein the method comprises: acquiring a text to be synthesized and inputting the text to a speech synthesis model, wherein the speech synthesis model comprises an encoding network, an attention network and a decoding network, wherein the encoding network converts the input text to be synthesized into an acoustic feature sequence; the attention network is used for outputting the attention vector, and the decoding network is used for outputting the target spectrum corresponding to the text to be synthesized according to the attention vector, the acoustic feature sequence and a state transition control factor; then, through the target spectrum corresponding to the text to be synthesized, the target audio with the target speech speed is obtained. According to the present disclosure, a state transition control factor is introduced into a speech synthesis model, and the number of target spectrums corresponding to the text to be synthesized is dynamically controlled by the state transition control factor, thereby realizing flexible speech speed adjustment in the speech synthesis process, and the audio synthesized by the method provided by the disclosure has high naturalness, which is beneficial to improve the user experience.

BRIEF DESCRIPTION OF DRAWINGS

The accompanying drawings, which are incorporated in and constitute a part of this specification, illustrate embodiments consistent with the disclosure and together with the description, serve to explain the principles of the disclosure.

To explain the technical scheme in the embodiment of the present disclosure or the prior art more clearly, the drawings needed in the description of the embodiment or the prior art will be briefly introduced below. Obviously, for ordinary people in the field, other drawings can be obtained according to these drawings without paying creative labor.

DETAILED DESCRIPTION

In order to understand the above objects, features and advantages of the present disclosure more clearly, the scheme of the present disclosure will be further described below. It should be noted that the embodiments of the present disclosure and the features in the embodiments can be combined with each other without conflict.

In the following description, many specific details are set forth in order to fully understand the present disclosure, but the present disclosure may be practiced in other ways than those described herein; Obviously, the embodiments in the specification are only part of the embodiments of the present disclosure, not all of them.

When using DSP technology to adjust the speech speed of audio, because DSP technology can only adjust the speech speed at the same speed for the whole audio, which cannot adjust the speech speed flexibly at different times, the speech speed of some audio segments in the whole audio may not be suitable for this audio segment.

In addition, using DSP technology to adjust the speech speed will adjust the effective frequency spectrum, which will easily lead to the tone change of the audio after adjusting the speech speed, that is, the timbre will change, which will lead to the low naturalness of the sound.

Based on this, the present disclosure provides a method, an apparatus, an electronic device, a readable storage medium, and a computer program product for speech speed adjustment, wherein, the method introduces a state transition control factor into a speech synthesis model, and uses the state transition control factor to control the number of target spectrum corresponding to the text to be synthesized output by the speech synthesis model, so as to flexibly adjust the speech speed in the speech synthesis process, and the audio synthesized by the method provided by the disclosure has high naturalness, which is beneficial to improving the user experience.

The speech speed adjustment method provided by the present disclosure can be executed by electronic device. Illustratively, the electronic device may include but is not limited to, a tablet computer, a mobile phone (such as a folding screen mobile phone, a large screen mobile phone, etc.), a wearable device, a vehicle-mounted device, an augmented reality (AR)/virtual reality (VR) devices, notebook computers, ultra-mobile personal computer (UMPC), netbooks, personal digital assistant (PDA), smart TVs, smart screens, high-definition TVs, 4K TVs, smart speakers, smart projectors and the internet of things (IOT) devices, etc., this disclosure does not limit the specific types of electronic devices.

In the following embodiments, the speech speed adjustment method provided by the present disclosure is introduced in detail by taking the speech speed adjustment method performed by the electronic device as an example, combined with the attached drawings and application scenarios.

Figure 1:
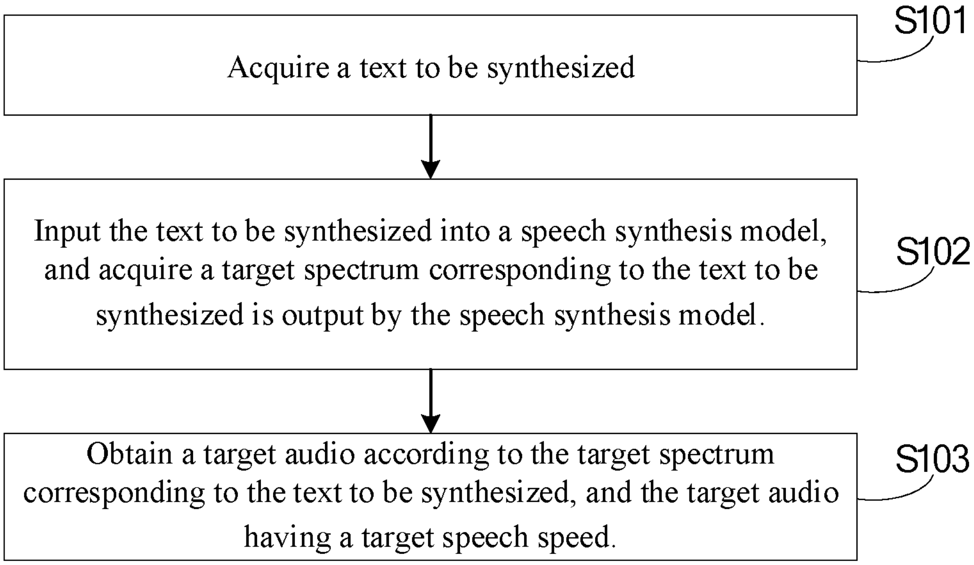
FIG. 1 is a flowchart of a method for speech speed adjustment provided by one embodiment of the present disclosure.

Please refer to FIG. 1, which is a flowchart of a speech speed adjustment method provided by an embodiment of the present disclosure. As illustrated in FIG. 1, the speech speed adjustment method provided by this embodiment may include:

S101, acquire a text to be synthesized.

The electronic device can acquire the text to be synthesized for synthesizing the target audio, and the text to be synthesized includes various elements for synthesizing the audio, wherein, the text to be synthesized may include characters for synthesizing audio, or the text to be synthesized may include phonemes for synthesizing audio.

The present disclosure does not limit the way to acquire the text to be synthesized. For example, the text to be synthesized can be input by users or obtained by electronic devices through audio recognition, translation, etc. This disclosure does not limit the language type of the text to be synthesized, and the text to be synthesized can be in Chinese or English, and of course, it can also be in other languages. In addition, this disclosure does not limit other parameters such as the number of elements (i.e., the length of the text) and the content of the text to be synthesized.

S102, input the text to be synthesized to the speech synthesis model and acquire the target spectrum corresponding to the text to be synthesized output by the speech synthesis model.

The speech synthesis model is a pre-trained machine learning model capable of speech synthesis, in which the speech synthesis model may also control the speech speed of the synthesized audio in the process of speech synthesis. This disclosure does not limit the type of speech synthesis model, network structure, etc.

Figure 2:
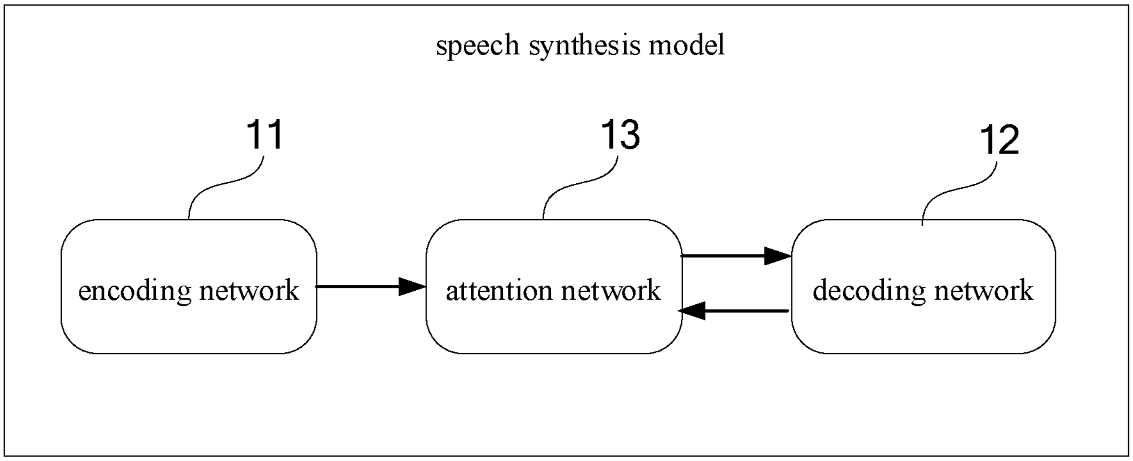
FIG. 2 is a structural diagram of a speech synthesis model provided by one embodiment of the present disclosure.

In some implementations, referring to the embodiment shown in FIG. 2, the speech synthesis model 10 may include an encoding network 11, a decoding network 12, and an attention network 13, wherein the attention network 13 is disposed between the encoding network 11 and the decoding network 12.

Specifically, the encoding network 11 receives the text to be synthesized as input and can acquire the acoustic features corresponding to each element by analyzing the acoustic feature sequences of different acoustic dimensions for each element in the text to be synthesized, wherein the acoustic features corresponding to each element constitute the acoustic feature sequences corresponding to the text to be synthesized according to the sequence of each element.

The above-mentioned different acoustic dimensions may include but are not limited to, one or more dimensions such as pitch dimension, pause dimension, a correlation between phonemes, word boundary dimension, etc. The present disclosure does not limit the structure of the encoding network 11 and the implementation of converting the text to be synthesized into an acoustic feature sequence.

It should be noted that when the text to be synthesized includes characters for synthesizing audio, the characters can be converted into phonemes first, and the speech synthesis model performs acoustic feature sequence analysis on each phoneme. The conversion of characters into phonemes may be performed by the speech synthesis model or implemented by other modules independent of the speech synthesis model, which is not limited to this disclosure. when the text to be synthesized includes phonemes for synthesizing audio, the encoding network 11 may directly perform acoustic feature sequence analysis on each phoneme.

It should also be noted that when analyzing the acoustic feature sequence of each element included in the text to be synthesized, a plurality of phonemes located before and after the phoneme can be analyzed as a whole for each phoneme, thus, the obtained acoustic feature sequence information corresponding to the phoneme may reflect the context information between the phonemes before and after.

The decoding network 12 may output the target spectrum corresponding to the text to be synthesized according to the attention vector input by the attention network 13, the acoustic feature sequence output by the encoding network 11, and the state transition control factor. Wherein, the state transition control factor is used for controlling the number of target spectrums corresponding to the text to be synthesized.

That is, in this scheme, an electronic device may adopt a speech synthesis model with an attention mechanism and control the number of target spectrums corresponding to the text to be synthesized output by the speech synthesis model based on the acoustic feature sequence and the state transition control factor, so as to flexibly control the speech speed of the synthesized target audio. Wherein, the more the number of spectrums, the slower the speech speed of audio; the less the number of spectrums, the faster the speech speed of audio.

In some embodiments, the target spectrum may include any one or more types of the spectrum such as the Mel spectrum, the combination of BFCC and pitch information, or spectral envelope, etc.

In some implementations, in the process of speech synthesis, the state transition control factor can be dynamically changed to meet the speech speed requirements of different sentences in the text to be synthesized. That is, in the process of speech synthesis, the size of the state transition control factor is dynamically adjusted through the preset updating strategy of the state transition control factor, so as to control the pronunciation duration of different audio segments, thus realizing that the speech speed of some audio segments or audio positions is accelerated or slowed down according to the requirements in the process of speech synthesis.

The present disclosure does not limit the specific implementation of the preset updating strategy of the state transition control factor. For example, the preset updating strategy of state transition control factor may be related to one or more of the following elements: target speech speed (which can also be understood as the adjustment ratio of speech speed, or it can also be understood as the difference between the speech speed of target audio and the standard speech speed), the acoustic feature sequence corresponding to the text to be synthesized, the importance of the text content to be expressed in the current step, the situation of duration of the sentence (or the paragraph) to which the current step belongs, and so on.

Illustratively, when the target speech speed is fast, the size of the state transition control factor can be reduced; when the target speech speed is slow, the size of the state transition control factor can be increased.

Illustratively, when the acoustic feature sequence of the text to be synthesized is analyzed and it is determined that the acoustic feature sequence information corresponding to the current step has a strong correlation with the acoustic feature sequence before the current step, the size of the state transition control factor may be increased for the current step; when the acoustic feature sequence of the text to be synthesized is analyzed and it is determined that the acoustic feature sequence information corresponding to the current step has a strong correlation with the acoustic feature sequence after the current step, the size of the state transition control factor may be reduced for the current step.

Illustratively, when the importance of the text content to be expressed in the current step is high, the size of the state transition control factor can be reduced for the current step; when the importance of the text content to be expressed in the current step is low, the size of the state transition control factor can be increased for the current step.

Illustratively, when the duration of the sentence to which the current step belongs is longer, but the text content is less, the speech speed here may be slowed down, thus, the size of the state transition control factor may be increased; when the duration of the sentence in the current step is short, but there are many words, the speech speed here can be accelerated, thus, the size of the state transition control factor can be reduced.

S103, obtain the target audio according to the target spectrum corresponding to the text to be synthesized, and the target audio having a target speech speed.

Electronic devices can play according to the target spectrum corresponding to the text to be synthesized and at the preset playing speed, so as to obtain the target audio with the target speech speed.

The method of this embodiment acquires the text to be synthesized, and inputs the text to be synthesized to a speech synthesis model, which includes an encoding network, an attention network, and a decoding network, wherein the encoding network converts the input text to an acoustic feature sequence; the attention network is used for outputting the attention vector, and the decoding network is used for outputting the target spectrum corresponding to the text to be synthesized according to the attention vector, the acoustic feature sequence and the state transition control factor; then, through the target spectrum corresponding to the text to be synthesized, the target audio with the target speech speed is obtained. In the present disclosure, a state transition control factor is introduced into a speech synthesis model, and the number of target spectrums corresponding to the text to be synthesized is dynamically controlled by the state transition control factor, thereby realizing flexible speech speed adjustment in the speech synthesis process. The audio synthesized by the method provided by the disclosure has high naturalness, which is beneficial to improving the user experience.

Next, the speech synthesis model provided by the present disclosure and the implementation of the decoding network are exemplarily introduced in detail.

Figure 3:
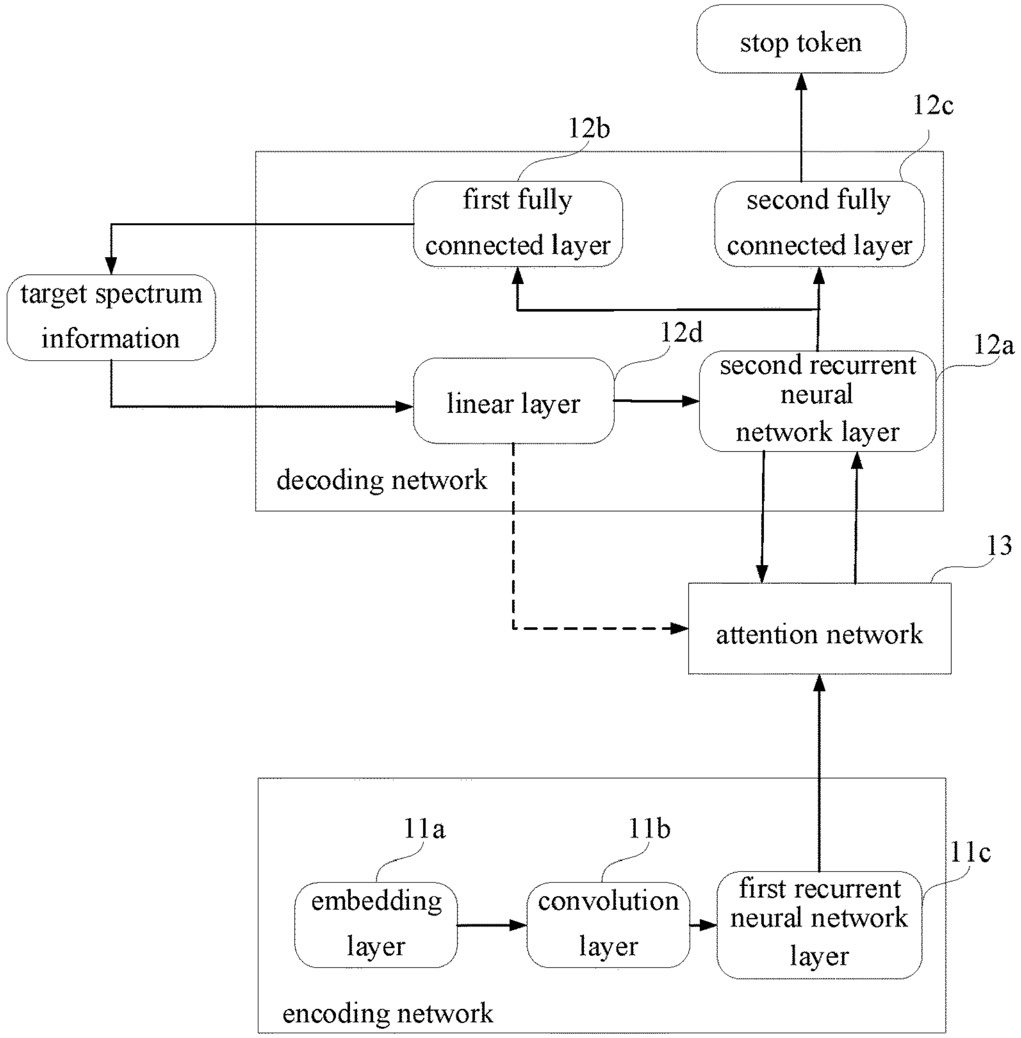
FIG. 3 is a structural diagram of a speech synthesis model provided by another embodiment of the present disclosure.

Please refer to FIG. 3, which is a schematic structural diagram of a speech synthesis model provided by an embodiment of the present disclosure. Based on the embodiment shown in FIG. 2, it can be seen that the speech synthesis model 10 provided by this embodiment can include an encoding network 11, a decoding network 12, and an attention network 13. And that attention network 13 is disposed between the encoding network 11 and the decoding network 12.

Wherein, the encoding network 11 and the decoding network 12 respectively comprise a recurrent neural network.

Wherein, the encoding network 11 may include an embedding layer 11*a*, a convolution layer 11*b*, and a first recurrent neural network layer 11*c*.

The encoding network 11 is mainly used to receive the text to be synthesized, and use the embedding layer 11*a* to convert or map each element included in the text into a mathematical vector expression; and input the mathematical vector expression corresponding to each element included in the text to be synthesized to the convolution layer 11*b* for convolution processing to obtain the convolution-processed feature vector; the feature vectors obtained by convolution processing are output to the first recurrent neural network layer 11*c*, and the first recurrent neural network layer 11*c* performs feature extraction, dimension upgrading and other processing and the like, on the feature vectors output by the convolution layer 11*b* to obtain high-dimensional acoustic feature information corresponding to each element, and the acoustic feature information corresponding to these elements is spliced together according to the sequence of elements, thereby obtaining the acoustic feature sequence corresponding to the text to be synthesized.

Wherein, the embedded layer 11*a* may belong to a part of the encoding network 11 As illustrated in FIG. 3. In practical use, the embedded layer 11*a* can also be a network layer independent of the encoding network 11, which is set before the encoding network 11, and whether the embedded layer 11*a* is bound with the encoding network 11 can be flexibly deployed according to requirements.

Wherein, the decoding network 12 may include a second recurrent neural network layer 12*a*, a first fully connected layer 12*b*, a second fully connected layer 12*c*, and a linear layer 12*d*.

Wherein, the second recurrent neural network layer 12*a* is mainly used to receive the target vector corresponding to the current step from the attention network 13, and convert the target vector corresponding to the current step to obtain the target state quantity of the current step. The target vector corresponding to the current step is calculated by weighting the attention vector output by the attention network 13 and the acoustic feature sequence corresponding to the text to be synthesized.

Wherein, the second recurrent neural network layer 12*a* can obtain the target state quantity of the current step in the following way, which may include the following steps, for example:

Step (a) converts the input target vector of the current step to obtain the initial state quantity corresponding to the current step.

Step (b) generates a mask according to that state transition control factor.

Step (c) weights the initial state quantity of the current step and the target state quantity of the previous step based on the mask to obtain the target state quantity of the current step.

Taking the second recurrent neural network layer 12*a* including the LSTM network as an example, the target state quantity corresponding to each step includes a first target state quantity and a second target state quantity, wherein the first target state quantity can be expressed as a hidden state and the second target state quantity can be expressed as a cell state; accordingly, the target state quantity of the current step can be expressed by Formula (1) as follows:

$$c_t = d_t^c \; e \; c_{t-1} + (1 - d_t^c) \; e \; c_t' \qquad \text{Formula (1)}$$

$$h_t = d_t^h \; e \; h_{t-1} + \left(1 - d_t^h\right) \; e \; h_t'$$

In Formula (1), $c_t$ represents the first target state quantity of the current step, $h_t$ represents the second target state quantity of the current step, $c_{t-1}$ represents the first target state quantity of the previous step, $h_{t-1}$ represents the second target state quantity of the previous step, $c_t'$ represents the first initial state quantity of the current step, $h_t'$ represents the second initial state quantity of the current step, $$d_t^c$$

represents the mask for $c_t$ generated according to the state transition control factor corresponding to the current step, and $$d_t^h$$

represents the mask for $h_t$ generated according to the state transition control factor corresponding to the current step.

It should be noted that the second recurrent neural network layer 12*a* has a corresponding relationship between the target state quantity output in each step and the target spectrum output in this step, wherein the target spectrum output in each step is an observation quantity, and the target state quantity in this step is a hidden quantity in the middle of spectrum feature extraction by the decoding network 12.

The target state quantity of the current step is output to the first fully connected layer 12*b* and the second fully connected layer 12*c*, respectively.

When the second recurrent neural network layer 12*a* is implemented by LSTM, the first target state quantity of the current step can be output to the first fully connected layer 12*b* and the second fully connected layer 12*c*, respectively; the second recurrent neural network layer 12*a* records the second target state quantity of the current step for the calculation of the initial state quantity of the next step.

The first fully connected layer 12*b* is mainly used to convert the received target state corresponding to the current step into the target spectrum corresponding to the current step. The present disclosure is not limited to the implementation of the first fully connected layer 12*b*.

In some implementations, the target state quantity of the current step is input to the second fully connected layer, and the stop token output by the second fully connected layer is acquired, including: inputting the target state quantity of the current step to the second fully connected layer, performing a weighted calculation on the target state quantity of the current step through the second fully connected layer, and acquiring the weighted calculation result as the stop token; accordingly, after acquiring the weighted calculation result and taking it as a stop token, it further includes: when the stop token is greater than or equal to a preset threshold, determining that the stop token has been reached the end position of the text to be synthesized; when the stop character is smaller than the preset threshold, it is determined that the stop character has not been reached the end position of the text to be synthesized. Alternatively, the target state quantity of the current step is input to the second fully connected layer, and the stop token output by the second fully connected layer is acquired, including: inputting the target state quantity of the current step to the second fully connected layer, performing a weighted calculation on the target state quantity of the current step through the second fully connected layer, and classifying the weighted calculation result by using sigmoid function to acquire the classification result as a stop token.

The second fully connected layer 12*c* is used for converting the received target state corresponding to the current step into a one-dimensional stop token. The present disclosure does not limit the calculation method of the second fully connected layer 12*c* to obtain the stop token. For example, the second fully connected layer 12*c* can obtain a one-dimensional stop token by a weighted calculation of the target state quantity of the current step; For another example, the second fully connected layer 12*c* can obtain a weighted calculation result by weighting the target state quantity of the current step, and then classify the weighted calculation result by using sigmoid function to obtain a one-dimensional stop token.

The stop token is used for indicating whether the current step has reached the end position of the text to be synthesized; when the stop token indicates that the current step has reached the end position of the text to be synthesized, the target spectrum prediction for the text to be synthesized is ended; when the stop token indicates that the current step has not reached the end position of the text to be synthesized, the target spectrum prediction for the text to be synthesized needs to be continued.

If the stop token indicates that the current step has not reached the end position of the text to be synthesized, the linear layer 12*d* extracts effective information from the existing target spectrums and transmits the extracted effective information to the attention network 13, so that the attention network 13 updates the attention vector and makes the next target spectrums prediction.

In some embodiments of the present disclosure, the target spectrum of the current step are extracted through the linear layer and input to the attention network, so that the attention network updates the attention vector, including: inputting effective information extracted from the existing target spectrums to the attention network through the linear layer so that the attention network generates and updates the attention vector according to the effective information extracted from the existing target spectrums; alternatively, the effective information extracted from the existing target spectrums is input to the recurrent neural network layer through the linear layer, and the effective information extracted from the existing target spectrums is input to the attention network through the recurrent neural network layer so that the attention network can generate and update the attention vector according to the effective information extracted from the existing target spectrums.

In some implementations, the linear layer 12*d* can directly extract effective information from the existing target spectrums and input it to the attention network 13. As shown by the dashed line with an arrow in FIG. 3.

In other implementations, the linear layer 12*d* may also input the effective information extracted from the existing target spectrums to the second recurrent neural network layer 12*a*, so as to transmit the effective information extracted from the existing target spectrums to the attention network 13 through the second recurrent neural network layer 12*a*. As illustrated in FIG. 3 by a solid line with an arrow pointing from the second recurrent neural network layer 12*a* to the attention network 13.

Wherein, the second recurrent neural network layer 12*a* can adopt a preset algorithm to convert the effective information extracted from the existing target spectrums information, and the present disclosure does not limit the preset algorithm. Of course, the second recurrent neural network layer 12*a* may not process the effective information extracted from the existing target spectrums information.

Wherein, the linear layer 12*d* can be understood as a pre-auxiliary network layer, which extracts the effective information in the existing target spectrums and ignores the invalid information in the target spectrum. For example, the linear layer 12*d* can extract the effective information of the target spectrum in the current step to predict the target spectrum in the next step; Alternatively, the linear layer 12*d* can also extract the effective information of the target spectrum corresponding to the reciprocal steps, so as to predict the target spectrum in the next step, which is not limited by this disclosure.

The attention network 13 is mainly used for receiving the effective information of the existing target spectrums (for example, the effective information of the current target spectrums) output by the second recurrent neural network layer 12*a*, and generating an updated attention vector according to the received effective information of the target spectrum, and the updated attention vector is weighted with the acoustic feature sequence corresponding to the text to be synthesized, and the result of the weighted calculation will be used as the input for the decoding network 12 to predict the next target spectrums.

In this scheme, performing a weighted calculation on the attention vector and the acoustic feature sequence, and the weighted calculation results are transmitted to the decoding network 12, which is equivalent to transmitting the information of the acoustic feature sequence and the attention mechanism to the decoding network 12, so that the decoding network 12 can determine which related areas of the acoustic feature sequence should be focused on when predicting the target spectrum, thus ignoring the irrelevant features or areas with low correlation included in the acoustic feature sequence. In addition, the dimension of the weighted calculation result is low, which is beneficial to reduce the calculation amount of the decoding network 12.

In addition, when the decoding network 12 predicts the target spectrum of the first step, the initial value of the attention vector may be preset, or it may be determined by the electronic device by analyzing the acoustic feature sequence corresponding to the text to be synthesized, and the implementation of determining the initial value of the attention vector is not limited in this disclosure.

It should also be illustrated that when the decoding network 12 performs mask weighted fusion on the initial state quantity of the current step and the target state quantity of the previous step according to the state transition control factor when predicting the target spectrum when the effect of the target state quantity of the previous step is greater, the target state quantity of the current step is closer to the target state quantity of the previous step, and the generated target spectrums of the current step is closer to the target spectrum of the previous step; when the effect of the target spectrum of the previous step is smaller, the difference between the target state quantity of the current step and the target state quantity of the previous step is greater, and the generated target spectrums of the current step are greater. Wherein, controlling the size of the effect of the target state quantity in the previous step in mask weighted fusion is realized by the state transition control factor.

Wherein, the greater the effect of the target state quantity of the previous step, the closer the target spectrum of the previous step is to the target spectrum of the previous step, and the attention network 13 extracts the effective information of the target spectrum of the current step as the inquiry quantity of attention based on the linear layer 12*d*, and the inquired acoustic feature sequence for predicting the target spectrum of the next step is closer to the acoustic feature sequence for predicting the target spectrum of the current step. The attention vector generated by the attention network is close to the attention vector of the previous step, which shows that the moving speed on the text position to be synthesized is slow, and the slower the moving speed on the text position, the more the target spectrum is, and the slower the speech speed of the target audio is; Similarly, the smaller the effect of the target state quantity of the previous step, the greater the difference between the target spectrum of the previous step and the target spectrum of the previous step. The attention network 13 extracts the effective information of the target spectrum of the current step as the query quantity of attention based on the linear layer 12*d*, and the greater the difference between the acoustic feature sequence for predicting the target spectrum of the next step and the acoustic feature sequence for predicting the target spectrum of the current step. The greater the difference between the attention vector generated by the attention network and the attention vector of the previous step, this shows that the moving speed on the text position to be synthesized is faster, and the faster the moving speed on the text position, the smaller the number of the target spectrum, and then the faster the speech speed of the target audio. In this way, the number of target spectrums is controlled by the state transition control factor, that is, the number of target spectrums is controlled by the state transition control factor, and then the speech speed of target audio is controlled.

In some implementations, the first recurrent neural network layer 11*c* may include any type of recurrent neural network such as a long short term memory (LSTM), a gate recurrent unit (GRU), a simple recurrent unit (SRU) and so on.

In some implementations, the second recurrent neural network layer 12*a* may include any type of recurrent neural network such as LSTM, GRU, SRU, etc. In some implementations, the second recurrent neural network layer 12*a* may include a plurality of recurrent neural networks, such as the embodiment shown in FIG. 3, and the second recurrent neural network layer 12*a* includes two LSTM networks connected in sequence.

In addition, the first recurrent neural network layer 11*c* and the second recurrent neural network layer 12*a* may also include other types of recurrent neural networks. The above is only an example, and is not a limitation on the network types adopted by the first recurrent neural network layer 11*c* and the second recurrent neural network layer 12*a*.

In addition, the first recurrent neural network layer 11*c* and the second recurrent neural network layer 12*a* may adopt the same type of recurrent neural networks or different types of recurrent neural networks, which is not limited in this disclosure.

Based on the embodiments shown in FIGS. 1 to 3, the speech speed adjustment method provided by the present disclosure will be introduced in detail through a specific example.

Suppose that the text to be synthesized is A, including N phonemes, wherein the first phoneme is denoted as A1, the second phoneme is denoted as A2, the third phoneme is denoted as A3, and so on, and the last phoneme is denoted as AN.

Combining with the speech synthesis model 10 provided by the embodiment shown in FIG. 2 and FIG. 3, the text to be synthesized A is input to the encoding network 11, and the acoustic feature sequence X corresponding to the text to be synthesized A output by the encoding network 11. The implementation of the encoding network 11 to convert the text to be synthesized A into the acoustic feature sequence X can refer to the description of the previous embodiment, which is not repeated here for brevity.

When predicting the target spectrum of the first step, the initial value of the attention vector provided by the attention network 13 is recorded as S0, and S0 and the acoustic feature sequence X are weighted to obtain the target vector Y1 corresponding to the first step, and the target vector Y11 is input to the decoding network 12.

The second recurrent neural network layer 12*a* of the decoding network 12 acquires the initial state quantity corresponding to the first step by converting the target vector Y11, and then performs mask weighted fusion on the initial state quantity corresponding to the first step and the target state quantity of the previous step by the state transition control factor K1 corresponding to the first step to output the target state quantity corresponding to the first step. It should be noted that in the first step of mask weighted fusion, the target state quantity of the previous step can be preset, for example, the target state quantity of the previous step can be 0.

Wherein, when the second recurrent neural network layer 12*a* includes two layers of connected LSTM, the initial state quantity corresponding to the first step includes the first initial state quantity and the second initial state quantity, and the target state quantity of the first step includes the first target state quantity and the second target state quantity. The first target state quantity and the second target state quantity are obtained by weighted fusion according to the mask, which can be calculated by combining with the aforementioned formula (1). For simplicity, here are omitted.

It is assumed that the target state quantities corresponding to the first step include a first target state quantity c1 and a second target state quantity h1.

The second target state quantity h1 of the first step is input to the first fully connected layer 12*b* and the second fully connected layer 12*c*, respectively.

The first fully connected layer 12*b* outputs the target spectrum P1 of the first step by converting the second target state quantity h1.

The second fully connected layer 12*c* calculates the second target state quantity h1 and outputs the stop token R1 corresponding to the first step.

Illustratively, when the second fully connected layer 12*c* obtains a weighted calculation result by weighting the target vector Y1, the weighted calculation result is the stop token R1; when the stop token R1 is greater than or equal to the preset threshold, it is determined that the stop token indicates that the end position of the text to be synthesized has been reached; when the stop token R1 is smaller than the preset threshold, it is determined that the stop indicates that the end position of the text to be synthesized has not been reached.

Illustratively, when the second fully connected layer 12*c* obtains a weighted calculation result by weighting the target vector Y1, and classifies the weighted calculation result with sigmoid function, the obtained classification result is the stop token R1. Assuming that the classification result is represented by 0 or 1, when the stop token R1 is 1, it is determined that the stop indicates that the text to be synthesized has reached the end position; when the stop token R1 is 0, it is determined that the stop indicates that the end position of the text to be synthesized has not been reached.

If the stop token R1 indicates that the end position of the text to be synthesized A has not been reached, the linear layer 12*d* extracts the effective information of the target spectrum P1 and transmits the effective information of the target spectrum P1 to the attention network 13.

In some implementations, the linear layer 12*d* can directly input the effective information of the target spectrum P1 to the attention network 13. In other implementations, the linear layer 12*d* may also input the effective information of the target spectrum P1 to the second recurrent neural network layer 12*a*, so as to transmit the effective information of the target spectrum P1 to the attention network 13 through the second recurrent neural network layer 12*a*.

Wherein, the second recurrent neural network layer 12*a* may adopt a preset algorithm to convert the effective information of the target spectrum information P1, and the present disclosure does not limit the preset algorithm. Of course, the second recurrent neural network layer 12*a* may not process the effective information of the target spectrum information P1.

The attention network 13 receives the effective information of the target spectrum P1 as the query quantity, queries the acoustic feature sequence X, and outputs the updated attention vector S1. The attention vector S1 and the acoustic feature sequence X are weighted to obtain the target vector Y2 corresponding to the second step, and the target vector Y2 is input to the decoding network 12 so that the decoding network 12 can predict the target spectrum corresponding to the second step.

The implementation of the decoding network 12 to predict the target spectrum corresponding to the second step is similar to the implementation of the decoding network 12 to predict the target spectrum corresponding to the first step, which is not described here.

It is assumed that the first fully connected layer 12*b* outputs the target spectrum P2 of the second step, and the second fully connected layer 12*c* outputs the stop token R2 corresponding to the second step. when the stop token R2 indicates that the end position of the text to be synthesized A has not been reached, the linear layer 12*d* extracts the effective information of the target spectrum P2 and transmits the effective information of the target spectrum P2 to the attention network 13, so that the attention network 13 can query the acoustic feature sequence X according to the effective information of the target spectrum P2 and output the attention vector S2 for predicting the target spectrum in the third step. The attention vector S2 and the acoustic feature sequence X are weighted to obtain the target vector Y3 corresponding to the third step, and the target vector Y3 is input to the decoding network 12, so that the decoding network 12 can predict the target spectrum P3 corresponding to the third step.

And so on, until the stop token indicates that the end position of the text to be synthesized A has been reached, the target spectrum prediction for the text to be synthesized A is stopped.

In the above process, the state transition control factor corresponding to each step can be dynamically changed, so that the speech speed of different audio segments in the final synthesized target audio can be flexibly controlled in the speech synthesis process. Wherein, the implementation of updating the state transition control factor corresponding to each step can refer to the detailed introduction in the previous article, which is not repeated here for brevity.

Then, the target spectrum corresponding to each step output by the decoding network 12 are spliced together in sequence, that is, the target spectrum corresponding to the text to be synthesized A. By playing the target spectrum at a preset speed, the target audio with the target speech speed can be obtained.

The method of this embodiment, inputs the text to be synthesized into a speech synthesis model by acquiring the text to be synthesized, and the speech synthesis model includes an encoding network, an attention network, and a decoding network, wherein the encoding network converts the input text into an acoustic feature sequence; the attention network is used for outputting the attention vector, and the decoding network is used for outputting the target spectrum according to the attention vector, the acoustic feature sequence and the state transition control factor. Then, through the target spectrum, the target audio with the target speech speed is obtained. According to the present disclosure, a state transition control factor is introduced into a speech synthesis model, and the number of target spectrums is dynamically controlled by the state transition control factor, thereby realizing flexible speech speed adjustment in the speech synthesis process. And the audio synthesized by the method provided by the disclosure has high naturalness, which is beneficial to improving the user experience.

Illustratively, the present disclosure also provides an apparatus for speech speed adjustment.

Figure 4:
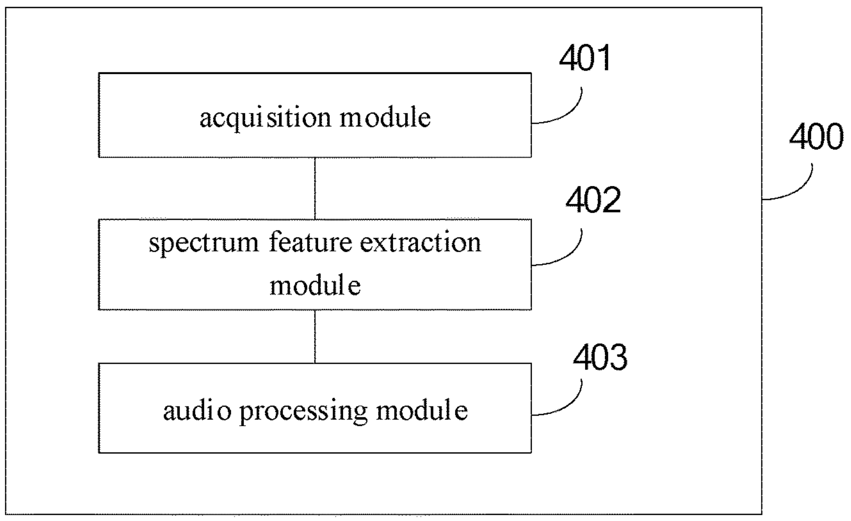
FIG. 4 is a structural diagram of an apparatus for speech speed adjustment provided by one embodiment of the present disclosure.

FIG. 4 is a structural diagram of an apparatus for speech speed adjustment provided by an embodiment of the present disclosure. As illustrated in FIG. 4, the speech speed adjustment apparatus 400 provided by this embodiment may include:

An acquisition module 401, is configured to acquire a text to be synthesized.

A spectrum feature extraction module 402, configured to input the text to be synthesized to a speech synthesis model and acquire a target spectrum corresponding to the text to be synthesized output by the speech synthesis model, wherein the speech synthesis model comprises an encoding network, an attention network and a decoding network, and the encoding network is used for converting the input text to be synthesized into an acoustic feature sequence; the attention network is used for outputting an attention vector, and the decoding network is used for outputting a target spectrum corresponding to the text to be synthesized according to the attention vector being input, the acoustic feature sequence and a state transition control factor; the state transition control factor is used for controlling the number of the target spectrum.

An audio processing module 403, is configured to acquire target audio according to the target spectrum corresponding to the text to be synthesized, and the target audio having a target speech speed.

In some implementations, when the state transition control factor is smaller than a preset threshold, the target speech speed of the target audio is smaller than the reference speech speed; when the state transition control factor is greater than the preset threshold, the target speech speed of the target audio is greater than the reference speech speed; when the state transition control factor is equal to the preset threshold, the target speech speed of the target audio is equal to the reference speech speed.

In some implementations, the decoding network includes a first fully connected layer, a second fully connected layer, a linear layer, and a recurrent neural network layer.

Accordingly, the spectrum feature extraction module 402 is specifically used for performing a weighted calculation on the attention vector and the acoustic feature sequence to obtain a target vector of the current step, and inputting the target vector of the current step to the recurrent neural network layer; the recurrent neural network layer acquires a target state quantity of the current step according to the target vector of the current step, the state transition control factor and a target state quantity of the previous step; inputting the target state quantity of the current step to the first fully connected layer, and acquiring the target spectrum of the current step output by the first fully connected layer; inputting the target state quantity of the current step to the second fully connected layer, and acquiring a stop token output by the second fully connected layer; when the stop token indicates that the end position of the text to be synthesized is not reached, extracting the target spectrum of the current step through the linear layer and inputting it to the attention network, so that the attention network updates the attention vector; returning to perform a weighted calculation on the attention vector and the acoustic feature sequence to obtain the target vector of the current step, and inputting the target vector of the current step to the recurrent neural network layer; the recurrent neural network layer acquires the target state quantity of the current step according to the target vector of the current step, the state transition control factor and the target state quantity of the previous step; and inputting the target state quantity of the current step to the first fully connected layer, and acquiring the target spectrum of the current step output by the first fully connected layer; inputting the target state quantity of the current step to the second fully connected layer, and acquiring a stop token output by the second fully connected layer until the stop token indicates that the end position of the text to be synthesized has been reached.

In some implementations, the spectrum feature extraction module 402 is specifically used for performing mask weighted fusion according to the target vector of the current step, the state transition control factor, and the target state quantity of the previous step to acquire the target state quantity of the current step.

In some implementations, the spectrum feature extraction module 402 is specifically used for acquiring the initial state quantity of the current step according to the target vector; generating a mask according to the state transition control factor, and performing weighted fusion on the initial state quantity of the current step and the target state quantity of the previous step according to the mask to acquire the target state quantity of the current step.

In some implementations, the spectrum feature extraction module 402 is further used for updating the size of the state transition control factor corresponding to the current step before acquiring the target state quantity of the current step according to the target vector of the current step, the state transition control factor and the target state quantity of the previous step.

In some implementations, the spectrum feature extraction module 402 is specifically used for updating the size of the state transition control factor corresponding to the current step according to one or more of the target speech speed, the acoustic feature sequence corresponding to the text to be synthesized, and the importance of the text content corresponding to the current step.

The speech speed adjustment apparatus provided by this embodiment is used for implementing the technical scheme provided by any of the above-mentioned method embodiments, and its implementation principle and technical effect are similar. Please refer to the detailed description of the above-mentioned method embodiments, and for brevity, they will not be repeated here.

In some implementations, the spectrum feature extraction module 402 is specifically used for inputting the target state quantity of the current step to the second fully connected layer, and performing a weighted calculation on the target state quantity of the current step through the second fully connected layer to acquire a weighted calculation result as a stop token; the spectrum feature extraction module 402 is further specifically used for when the stop token is greater than or equal to a preset threshold, when the stop token is smaller than the preset threshold, determining that the stop token has not been reached the end position of the text to be synthesized. Alternatively, the spectrum feature extraction module 402 is specifically used for inputting the target state quantity of the current step to the second fully connected layer, performing a weighted calculation on the target state quantity of the current step through the second fully connected layer, and classifying the weighted calculation result by using sigmoid function to acquire the classification result as a stop token.

In some implementations, the spectrum feature extraction module 402 is specifically used for inputting the effective information extracted from the existing target spectrums to the attention network through the linear layer, so that the attention network generates and updates the attention vector according to the effective information extracted from the existing target spectrums; alternatively, inputting the effective information extracted from the existing target spectrums to the recurrent neural network layer through the linear layer, and inputting the effective information extracted from the existing target spectrums to the attention network through the recurrent neural network layer, so that the attention network generates and updates the attention vector according to the effective information extracted from the existing target spectrums.

Illustratively, the disclosure also provides an electronic device.

Figure 5:
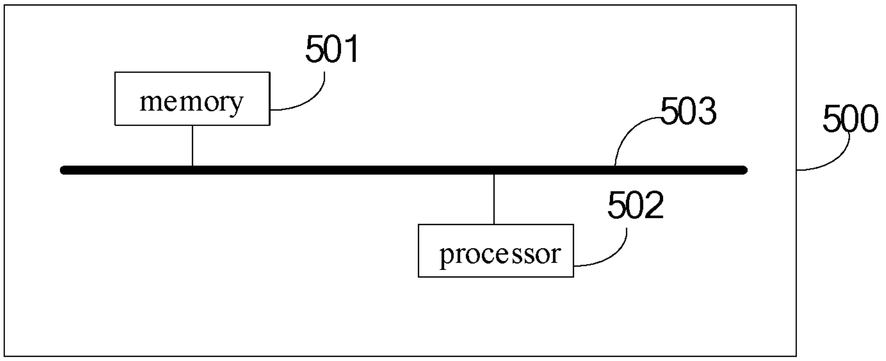
FIG. 5 is a schematic structural diagram of an electronic device provided by an embodiment of the present disclosure.

FIG. 5 is a schematic structural diagram of an electronic device provided by an embodiment of the present disclosure. As illustrated in FIG. 5, the electronic device 500 provided by this embodiment includes a memory 501 and a processor 502.

Wherein, the memory 501 can be an independent physical unit and can be connected with the processor 502 through a bus 503. The memory 501 and the processor 502 may also be integrated and realized by hardware.

The memory 501 is used for storing program instructions, and the processor 502 calls the program instructions to execute the speech speed adjustment method provided by any of the above method embodiments.

In some embodiments, when part or all of the methods in the above embodiments are implemented by software, the electronic device 500 may only include the processor 502. The memory 501 for storing programs is located outside the electronic device 500, and processor 502 is connected with the memory through circuits/wires for reading and executing the programs stored in the memory.

The processor 502 may be a central processing unit (CPU), a network processor (NP) or a combination of CPU and NP.

The processor 502 may further include a hardware chip. The hardware chip can be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

The memory 501 may include a volatile memory such as a random-access memory (RAM); the memory can also include non-volatile memory, such as flash memory, hard disk drive (HDD) or solid-state drive (SSD); the memory may also include a combination of the above kinds of memories.

The present disclosure also provides a computer-readable storage medium (which can also be called a readable storage medium), and the computer-readable storage medium includes computer program instructions, which when executed by at least one processor of the electronic device, cause the electronic device to realize the speech speed adjustment method provided by any of the above method embodiments.

The present disclosure also provides a computer program product, which includes computer program instructions stored in a readable storage medium, at least one processor of the electronic device can read the computer program instructions from the readable storage medium, and the at least one processor executes the computer program instructions to enable the electronic device to realize the speech speed adjustment method as provided in any method embodiment.

It should be noted that in this paper, relational terms such as "first" and "second" are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, a method, an object, or a device including a series of elements includes not only those elements but also other elements not explicitly listed or elements inherent to such process, method, article or equipment. Without further restrictions, an element defined by the phrase "including one . . . " does not exclude the existence of other identical elements in the process, the method, the object or the device including the element.

What has been described above is only the specific embodiment of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, this disclosure will not be limited to the embodiments described herein, but is to be accorded the widest protection scope consistent with the concepts and novel features disclosed herein.

What is claimed is:

1. A method for speech speed adjustment, comprising:

acquiring a text to be synthesized;

inputting the text to be synthesized to a speech synthesis model, and acquiring a spectrum corresponding to the text to be synthesized output by the speech synthesis model, wherein the speech synthesis model comprises an encoding network, an attention network and a decoding network, with the encoding network being used for converting the input text to be synthesized into an acoustic feature sequence, the attention network being used for outputting the attention vector, and the decoding network being used for outputting the spectrum corresponding to the text to be synthesized according to the attention vector being input, the acoustic feature sequence and a state transition control factor, the spectrum corresponding to the text to be synthesized comprises a plurality of first spectrums, and the state transition control factor is used for controlling a number of the plurality of first spectrums; and acquiring an audio of the spectrum corresponding to the text to be synthesized according to the spectrum corresponding to the text to be synthesized, wherein the audio has a specified speech speed;

wherein when the decoding network predicts the spectrum, performing a weighted calculation on the attention vector and the acoustic feature sequence to obtain a vector of a current step; acquiring an initial state quantity of the current step based on the vector of the current step; generating a mask according to the state transition control factor, and performing weighted fusion on the initial state quantity of the current step and a state quantity of the previous step according to the mask to obtain a state quantity of the current step.

2. The method of claim 1, wherein when the state transition control factor is smaller than a preset threshold, the specified speech speed of the audio is smaller than a reference speech speed;

when the state transition control factor is greater than the preset threshold, the specified speech speed of the audio is greater than the reference speech speed; and when the state transition control factor is equal to the preset threshold, the specified speech speed of the audio is equal to the reference speech speed.

3. The method of claim 1, wherein the decoding network comprises a first fully connected layer, a second fully connected layer, a linear layer, and a recurrent neural network layer;

the decoding network being used for outputting the spectrum corresponding to the text to be synthesized according to the attention vector being input, the acoustic feature sequence and the state transition control factor, comprises:

performing the weighted calculation on the attention vector and the acoustic feature sequence to obtain the vector of the current step, and inputting the vector of the current step to the recurrent neural network layer;

the recurrent neural network layer acquiring the state quantity of the current step according to the vector of the current step, the state transition control factor, and a state quantity of the previous step;

inputting the state quantity of the current step to the first fully connected layer, and acquiring a first spectrum of the current step output by the first fully connected layer;

inputting the state quantity of the current step to the second fully connected layer, and acquiring a stop token output by the second fully connected layer;

when the stop token indicates that an end position of the text to be synthesized is not reached, extracting the first spectrum of the current step through the linear layer and inputting the first spectrum of the current step to the attention network, so that the attention network updates the attention vector; and returning to perform the weighted calculation on the attention vector and the acoustic feature sequence to obtain the vector of the current step, and inputting the vector of the current step to the recurrent neural network layer, with the recurrent neural network layer acquiring the state quantity of the current step according to the vector of the current step, the state transition control factor and the state quantity of the previous step; inputting the state quantity of the current step to the first fully connected layer, and acquiring the first spectrum of the current step output by the first fully connected layer; inputting the state quantity of the current step to the second fully connected layer, and acquiring a stop token output by the second fully connected layer until the stop token indicates that the end position of the text to be synthesized has been reached.

4. The method of claim 3, wherein before the acquiring the state quantity of the current step according to the vector of the current step, the state transition control factor, and the state quantity of the previous step, the method further comprises:

updating the size of the state transition control factor corresponding to the current step.

5. The method of claim 4, wherein the updating the size of the state transition control factor corresponding to the current step, comprises:

updating the size of the state transition control factor corresponding to the current step according to one or more selected from the group consisting of the specified speech speed, the acoustic feature sequence corresponding to the text to be synthesized, and the importance of the text content corresponding to the current step.

6. The method of claim 3, wherein the inputting the state quantity of the current step to the second fully connected layer and acquiring the stop token output by the second fully connected layer, comprises:

inputting the state quantity of the current step to the second fully connected layer, and performing a weighted calculation on the state quantity of the current step through the second fully connected layer to acquire a weighted calculation result as the stop token; and after acquiring the weighted calculation result and as the stop token, further comprises:

when the stop token is greater than or equal to a preset threshold, determining that the stop token has reached the end position of the text to be synthesized;

when the stop token is smaller than the preset threshold, determining that the stop token has not reached the end position of the text to be synthesized; or, the inputting the state quantity of the current step to the second fully connected layer and acquiring the stop token output by the second fully connected layer, comprises:

inputting the state quantity of the current step to the second fully connected layer, performing a weighted calculation on the state quantity of the current step through the second fully connected layer, and classifying the weighted calculation result by using a sigmoid function to acquire the classification result as a stop token.

7. The method of claim 3, wherein the extracting the first spectrum of the current step through the linear layer and inputting it to the attention network, so that the attention network updates the attention vector, comprises:

inputting the effective information extracted from the existing first spectrums to the attention network through the linear layer, so that the attention network generates and updates the attention vector according to the effective information extracted from the existing first spectrums; or inputting the effective information extracted from the existing first spectrums to the recurrent neural network layer through the linear layer, and inputting the effective information extracted from the existing first spectrums to the attention network through the recurrent neural network layer, so that the attention network generates and updates the attention vector according to the effective information extracted from the existing first spectrums.

8. The method of claim 1, wherein before the acquiring the state quantity of the current step according to the vector of the current step, the state transition control factor and the state quantity of the previous step, the method further comprises:

updating the size of the state transition control factor corresponding to the current step.

9. The method of claim 1, wherein before the acquiring the state quantity of the current step according to the vector of the current step, the state transition control factor and the state quantity of the previous step, the method further comprises:

updating the size of the state transition control factor corresponding to the current step.

10. An electronic device comprising:

a memory and at least one processor, wherein the memory is configured to store computer program instructions; and the at least one processor is configured to execute the computer program instructions, causing the electronic device to perform a speech speed adjustment method, and the speech speed adjustment method comprises:

acquiring a text to be synthesized;

inputting the text to be synthesized to a speech synthesis model, and acquiring a spectrum corresponding to the text to be synthesized output by the speech synthesis model, wherein the speech synthesis model comprises an encoding network, an attention network and a decoding network, with the encoding network being used for converting the input text to be synthesized into an acoustic feature sequence, the attention network being used for outputting the attention vector, and the decoding network being used for outputting the spectrum corresponding to the text to be synthesized according to the attention vector being input, the acoustic feature sequence and a state transition control factor, the spectrum corresponding to the text to be synthesized comprises a plurality of first spectrums, and the state transition control factor is used for controlling a number of the plurality of first spectrums; and acquiring an audio of the spectrum corresponding to the text to be synthesized according to the spectrum corresponding to the text to be synthesized, wherein the audio has a specified speech speed;

when the decoding network predicts the spectrum, performing a weighted calculation on the attention vector and the acoustic feature sequence to obtain a vector of a current step; acquiring an initial state quantity of the current step based on the vector of the current step; generating a mask according to the state transition control factor, and performing weighted fusion on the initial state quantity of the current step and a state quantity of the previous step according to the mask to obtain a state quantity of the current step.

11. The electronic device of claim 10, wherein when the state transition control factor is smaller than a preset threshold, the specified speech speed of the audio is smaller than a reference speech speed;

when the state transition control factor is greater than the preset threshold, the specified speech speed of the audio is greater than the reference speech speed; and when the state transition control factor is equal to the preset threshold, the specified speech speed of the audio is equal to the reference speech speed.

12. The electronic device of claim 10, wherein the decoding network comprises a first fully connected layer, a second fully connected layer, a linear layer and a recurrent neural network layer;

the decoding network being used for outputting the spectrum corresponding to the text to be synthesized according to the attention vector being input, the acoustic feature sequence and the state transition control factor, comprises:

performing the weighted calculation on the attention vector and the acoustic feature sequence to obtain the vector of the current step, and inputting the vector of the current step to the recurrent neural network layer;

the recurrent neural network layer acquiring the state quantity of the current step according to the vector of the current step, the state transition control factor, and a state quantity of the previous step;

inputting the state quantity of the current step to the first fully connected layer, and acquiring a first spectrum of the current step output by the first fully connected layer; inputting the state quantity of the current step to the second fully connected layer, and acquiring a stop token output by the second fully connected layer;

when the stop token indicates that an end position of the text to be synthesized is not reached, extracting the first spectrum of the current step through the linear layer and inputting the first spectrum of the current step to the attention network, so that the attention network updates the attention vector; and returning to perform the weighted calculation on the attention vector and the acoustic feature sequence to obtain the vector of the current step, and inputting the vector of the current step to the recurrent neural network layer, with the recurrent neural network layer acquiring the state quantity of the current step according to the vector of the current step, the state transition control factor and the state quantity of the previous step; inputting the state quantity of the current step to the first fully connected layer, and acquiring the first spectrum of the current step output by the first fully connected layer; inputting the state quantity of the current step to the second fully connected layer, and acquiring a stop token output by the second fully connected layer until the stop token indicates that the end position of the text to be synthesized has been reached.

13. The electronic device of claim 12, wherein before the acquiring the state quantity of the current step according to the vector of the current step, the state transition control factor and the state quantity of the previous step, the apparatus is further configured to:

update the size of the state transition control factor corresponding to the current step.

14. The electronic device of claim 13, wherein the updating the size of the state transition control factor corresponding to the current step, comprises:

updating the size of the state transition control factor corresponding to the current step according to one or more selected from the group consisting of the specified speech speed, the acoustic feature sequence corresponding to the text to be synthesized and the importance of the text content corresponding to the current step.

15. A non-transitory computer-readable storage medium comprising: computer program instructions, wherein the computer program instructions, when executed by at least one processor of an electronic device, cause the electronic device to perform a speech speed adjustment method, and the speech speed adjustment method comprises:

acquiring a text to be synthesized;

inputting the text to be synthesized to a speech synthesis model, and acquiring a spectrum corresponding to the text to be synthesized output by the speech synthesis model, wherein the speech synthesis model comprises an encoding network, an attention network and a decoding network, with the encoding network being used for converting the input text to be synthesized into an acoustic feature sequence, the attention network being used for outputting the attention vector, and the decoding network being used for outputting the spectrum corresponding to the text to be synthesized according to the attention vector being input, the acoustic feature sequence and a state transition control factor, the spectrum corresponding to the text to be synthesized comprises a plurality of first spectrums, and the state transition control factor is used for controlling a number of the plurality of first spectrums; and acquiring an audio of the spectrum corresponding to the text to be synthesized according to the spectrum corresponding to the text to be synthesized, wherein the audio has a specified speech speed;

when the decoding network predicts the spectrum, performing a weighted calculation on the attention vector and the acoustic feature sequence to obtain a vector of a current step; acquiring an initial state quantity of the current step based on the vector of the current step; generating a mask according to the state transition control factor, and performing weighted fusion on the initial state quantity of the current step and a state quantity of the previous step according to the mask to obtain a state quantity of the current step.

* * * * *